US011542199B2

(12) United States Patent
Zhao et al.

(10) Patent No.: US 11,542,199 B2
(45) Date of Patent: Jan. 3, 2023

(54) HALOGEN-FREE QUATERNARY AMINES AND USES THEREOF

(71) Applicant: Huntsman Petrochemical LLC, The Woodlands, TX (US)

(72) Inventors: Haibo Zhao, The Woodlands, TX (US); Xiaohua Fang, The Woodlands, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 126 days.

(21) Appl. No.: 16/071,919

(22) PCT Filed: Jun. 28, 2017

(86) PCT No.: PCT/US2017/039678
§ 371 (c)(1),
(2) Date: Jul. 23, 2018

(87) PCT Pub. No.: WO2018/009386
PCT Pub. Date: Jan. 11, 2018

(65) Prior Publication Data
US 2019/0112229 A1    Apr. 18, 2019

Related U.S. Application Data

(60) Provisional application No. 62/358,720, filed on Jul. 6, 2016.

(51) Int. Cl.
| *C04B 24/12* | (2006.01) |
| *C11D 1/04* | (2006.01) |
| *C11D 1/40* | (2006.01) |
| *C11D 1/08* | (2006.01) |
| *C04B 28/02* | (2006.01) |
| *C09D 133/02* | (2006.01) |
| *C04B 28/04* | (2006.01) |
| *C04B 40/00* | (2006.01) |
| *C09D 17/00* | (2006.01) |
| *C04B 111/10* | (2006.01) |
| *C04B 103/32* | (2006.01) |

(52) U.S. Cl.
CPC .............. *C04B 24/12* (2013.01); *C04B 28/02* (2013.01); *C04B 28/04* (2013.01); *C04B 40/0039* (2013.01); *C09D 17/001* (2013.01); *C09D 17/003* (2013.01); *C09D 17/005* (2013.01); *C09D 133/02* (2013.01); *C11D 1/04* (2013.01); *C11D 1/08* (2013.01); *C11D 1/40* (2013.01); *C04B 2103/32* (2013.01); *C04B 2111/1062* (2013.01)

(58) Field of Classification Search
CPC ......... C04B 24/12; C04B 28/08; C04B 28/04; C04B 40/0039; C04B 2103/32; C04B 28/02; C09D 17/001; C09D 17/003; C09D 17/005; C09D 133/02; C11D 1/04; C11D 1/40; C11D 1/08
See application file for complete search history.

(56) References Cited

U.S. PATENT DOCUMENTS

| 3,948,673 | A | 4/1976 | Chase et al. |
|---|---|---|---|
| 5,232,497 | A | 8/1993 | Dillenbeck et al. |
| 5,393,343 | A | 2/1995 | Darwin et al. |
| 5,760,257 | A | 6/1998 | Tanaka et al. |
| 6,187,854 | B1 | 2/2001 | Spinelli et al. |
| 6,352,952 | B1 | 3/2002 | Jardine et al. |
| 6,670,415 | B2 | 12/2003 | Jardine et al. |
| 7,377,974 | B2 | 5/2008 | Grimm et al. |
| 7,674,843 | B2 | 3/2010 | Louwet et al. |
| 7,686,883 | B2 | 3/2010 | Kempter et al. |
| 9,244,326 | B2 | 1/2016 | Zhou et al. |
| 2002/0072482 | A1 | 6/2002 | Sachdev et al. |
| 2003/0113653 | A1* | 6/2003 | Zheng ............. B41C 1/1041 430/944 |
| 2003/0215522 | A1 | 11/2003 | Johnson et al. |
| 2007/0003716 | A1 | 1/2007 | Suzuki et al. |
| 2007/0287794 | A1 | 12/2007 | Alain et al. |
| 2013/0210992 | A1 | 8/2013 | Otley et al. |
| 2014/0296395 | A1 | 10/2014 | Lee et al. |

FOREIGN PATENT DOCUMENTS

| CN | 1268101 | 9/2000 |
|---|---|---|
| CN | 1508069 | 6/2004 |
| EP | 0986523 | 3/2000 |
| EP | 1082276 | 3/2001 |
| GB | 1511270 | 5/1978 |
| JP | 07-308563 | 11/1995 |
| JP | 11-302494 | 11/1999 |
| JP | 2000-143926 | 5/2000 |
| JP | 2006045010 A | 2/2006 |
| JP | 2008-528782 | 7/2008 |
| WO | 99/55634 | 11/1999 |
| WO | 2012/0134768 | 10/2012 |

OTHER PUBLICATIONS

EP Search Report completed Jan. 27, 2020 and dated Oct. 22, 2020.

* cited by examiner

*Primary Examiner* — John E Uselding
(74) *Attorney, Agent, or Firm* — Huntsman Petrochemical LLC

(57) ABSTRACT

The present disclosure provides an aqueous composition comprising a quaternary amine compound neutralized with a polycarboxylic acid. The aqueous composition is particularly useful for inerting clay in cement compositions as well as compatibilzing pigments in pigment dispersions.

13 Claims, No Drawings

HALOGEN-FREE QUATERNARY AMINES AND USES THEREOF

CROSS-REFERENCE TO RELATED APPLICATIONS

This application is the National Phase of International Application PCT/US2017/039678 filed Jun. 28, 2017 which designated the U.S. and which claims priority to U.S. App. Ser. No. 62/358,720 filed Jul. 6, 2016. The noted applications are incorporated herein by reference.

STATEMENT REGARDING FEDERALLY SPONSORED RESEARCH OR DEVELOPMENT

Not Applicable.

FIELD OF THE INVENTION

The present disclosure is directed to an aqueous composition comprising a halogen-free quaternary amine compound and the use of such an aqueous composition in the inerting of clay in cement compositions and improvement in the dispersibility, flowability and storage stability of pigment dispersions.

BACKGROUND OF THE INVENTION

Significant research has focused on developing compounds and methods to inert clay in cement compositions and stabilize pigment dispersions. For example, in cement compositions, which include a binder (e.g. plaster, calcium sulfates, lime, cement), it is known to add superplasticizers to reduce the water content of the binder slurry. Because adsorbing impurities, such as clays, are also present in the cement composition, the superplasticizers can become adsorbed at the surface of the clays and/or inserted between the sheets making up the clays thereby requiring an over dosage of superplasticizer which in turn can lead to a loss in compressive strength, cracking and durability of the cement composition. Therefore, it is necessary add an agent to inert the clays.

Several publications have addressed this issue including: U.S. Pat. Nos. 6,352,952 and 6,670,415 which discuss the addition of sacrificial compounds, such as polyethylene glycol, or inorganic or organic cations, such as quaternary amines, to inert the clays; US Pat. Publ. No. 2007/0287794 which discloses the use of cationic compounds, such as quaternary amines to the inert the clays; and JP Pat. No. 2006-45010 which utilizes compounds containing quaternary ammonium groups, such as poly-diallyldimethylammonium chloride, to inert the clays. However, these compounds usually contain chlorides that can cause corrosion problems in the finished cement or concrete structure.

With regards to pigment dispersions, pigment particles disperse, rather than dissolve, and therefore require dispersants to compatibilize the pigments with their encountering media. The major function/requirements for such dispersants include preventing agglomerating/sedimentation/segregation of the pigment particles during operation, and maintaining the flowability of the media at the required pigment loadings. To address this, compounds containing fragments of the pigment have been utilized, as described in U.S. Pat. Nos. 7,377,974, 7,686,883 and 9,244,326. In addition, compounds that can be chemically or physically adsorbed onto the surface of the pigment particles have been used including, for example: triethylene glycol naphthenate which is described in EP Pat. No. 0612821B1; AB block polymers and copolymers which are described in U.S. Pat. Nos. 6,187,854 and 7,674,843; and polyallylamines and derivatives thereof which are described in U.S. Pat. No. 5,760,257.

In spite of these state of the art compounds, there is a need to develop new, versatile compounds that are easy to prepare and may be used to mitigate clay effects in cement compositions and stabilize dispersions containing pigment particles.

SUMMARY OF THE INVENTION

The present disclosure provides an aqueous composition comprising a halogen-free quaternary amine compound neutralized with a polycarboxylic acid. In some aspects the polycarboxylic acid may be a polymer of an unsaturated monomer comprising a carboxyl group or a copolymer of the unsaturated monomer comprising a carboxyl group and a vinyl or olefin-based monomer.

In another aspect there is provided a method for inerting clays in a cement composition comprising the step of putting a constituent of the cement composition in contact with the aqueous composition containing the halogen-free quaternary amine compound neutralized with the polycarboxylic acid.

In still another aspect, there is provided a method for compatibilizing a pigment in a pigment dispersion comprising the step of contacting the pigment with the aqueous composition containing the halogen-free quaternary amine compound neutralized with the polycarboxylic acid.

In yet other aspects, there are provided cement compositions and pigment dispersions comprising the aqueous composition containing the halogen-free quaternary amine compound neutralized with the polycarboxylic acid.

DETAILED DESCRIPTION OF THE INVENTION

The following terms shall have the following meanings.

The term "halogen-free", when used in connection with a compound or composition, means that the compound or composition does not comprise the elements fluorine, chlorine, bromine and/or iodine.

The term "aqueous composition" means that the composition contains at least 0.5%, 1%, 5%, 10%, 20%, 30% or 40% by weight of water. It some aspects, it may contain a higher amount of water such as, for example, at least 50%, 60%, 70%, 80%, 90%, 95%, or even at least 99% by weight of water.

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article. By way of example, "a solvent" means one solvent or more than one solvent.

The phrases "in one aspect", "according to one aspect" and the like generally mean the particular feature, structure, or characteristic following the phrase is included in at least one aspect of the present disclosure, and may be included in more than one aspect of the present disclosure. Importantly, such phrases do not necessarily refer to the same aspect.

If the specification states a component or feature "may", "can", "could", or "might" be included or have a characteristic, that particular component or feature is not required to be included or have the characteristic.

A particular description of a compound in its acid form (i.e. "polycarboxylic acid"), shall be understood, where context permits, to include the salt form (i.e. "polycarboxylate").

The term "active" means a material capable of delivering benefits, for example, a clay inerting benefit and/or a pigment dispersing benefit, in a composition.

The terms "cement" and "cement composition" as used herein refer to pastes, mortars, grouts such as, but not limited to, oil well cementing grouts, and concrete compositions, all of which comprise a hydraulic cement binder. The terms "paste", "mortar" and "concrete" are terms of art: pastes are mixtures composed of a hydraulic cement binder (usually, but not exclusively, Portland cement, masonry cement, or mortar cement and may also include limestone powder, hydrated lime, fly ash, blast furnace slag, and silica fume or other materials commonly included in such cements) and water; "mortars" are pastes additionally including a fine aggregate such as sand; and "concretes" are mortars additionally including coarse aggregate, such as crushed stone or gravel. Cement compositions may be formed by mixing required amounts of certain materials, for example, a hydraulic cement binder, water, and fine and/or coarse aggregates, as appropriate for making the cementitious composition desired.

The term "clay" as used in the present disclosure includes inorganic materials, as may be contained in sand aggregates, which absorb superplasticizers, such as polycarboxylate dispersants, or otherwise decrease their dosage efficiency when present in cements or concrete containing such clay-containing aggregates. Such clays may include 2:1 clays, which are typically considered to be swelling, absorbing clays often identified as smectite, montmorillonite, bentonite, illite, kaolinite, chlorite, or hectorite clays. It is also contemplated that volcanic ash and amorphous clays are also included in the absorbtive type materials to be considered within the definition of "clay" as this term is used herein.

The term "polycarboxylate dispersant" refers to carboxylic acid/salt type dispersants as known in the art. These may also be referred to as oxyalkylene-containing water-reducers or EO/PO polymer superplasticizers. Polycarboxylate polymers have oxyalkylene or "EO/PO" constituents, and include "comb" polymers having EO/PO constituents located in the backbones and/or in pendant groups. EO/PO polymers are most often acrylic polymers or copolymers thereof, which are imidized, as taught in U.S. Pat. No. 5,393,343. Polycarboxylate dispersants and their use with clay-bearing aggregates is discussed in U.S. Pat. Nos. 6,352,952 and 6,670,415, the contents of which are herein incorporated by reference.

"Superplasticizers" in addition to polycarboxylate dispersants, may also include: sulfone salts of polycondensates of naphthalene and of formaldehyde, commonly called polynaphthalene sulfonates or further superplasticizers based on naphthalene; sulfone salts of polycondensates of melamine and of formaldehyde, commonly called melamine-based superplasticizers; lignosulfonates; and polyacrylates.

"Granulate" is meant to include a set of mineral grains with an average diameter of greater than 0 to 125 mm. Depending on their diameter, granulates are classified into one of the following six families: fillers, wind-blown sands, sands, sand-gravel mixes, grits and ballast (XP P 18-545 standard). The most used granulates are the following:
 fillers, which have a diameter of less than 2 mm and for which at least 85% of the granulates have a diameter of less than 1.25 mm and at least 70% of the granulates have a diameter of less than 0.063 mm,
 sands with a diameter comprised between 0 and 4 mm (in the 13-242 standard, the diameter may range up to 6 mm),
 sand-gravel mixes with a diameter of more than 6.3 mm,
 grits with a diameter comprised between 2 mm and 63 mm.

(The sands are therefore comprised in the definition of a granulate. The fillers may notably be of limestone or dolomitic origin.)

"Mineral addition" is meant to mean a finely divided mineral material used in concrete in order to improve certain properties or to give it particular properties.

The term "inerting of clay" and the like is to be understood to denote, according to the present disclosure, the at least partial neutralization of the harmful effects due to the presence of the clay in a cement composition, in particular in a cement composition comprising a superplasticizer.

According to one aspect, the present disclosure provides an aqueous composition comprising a halogen-free quaternary amine compound having a general formula (I)

$$[R_1R_2R_3R_4N^+]_n[X^-]_n \quad (I)$$

where $R_1$, $R_2$, $R_3$ and $R_4$ independently represent a linear, branched or cyclic, saturated or unsaturated, hydrocarbon chain having no more than 25 carbon atoms which may be optionally substituted with one or more hydroxyl groups, or wherein $R_1$, $R_2$ and $R_3$ are bound together to form a ring with the nitrogen atom bearing them; n is an integer equal to or greater than 1 and an upper limit of the number average of 30,000; and X is a counter anion whose provider compound is a polycarboxylic acid.

In some aspects, $R_1$, $R_2$, $R_3$ and $R_4$ may independently represent a linear or branched saturated hydrocarbon chain having no more than 20 carbon atoms which may be optionally substituted with one or more hydroxyl groups, or in another aspect $R_1$, $R_2$, $R_3$ and $R_4$ may independently represent a linear or branched hydrocarbon chain having no more than 10 carbon atoms which may be optionally substituted with one or more hydroxyl groups.

Examples of $R_1R_2R_3R_4N^-$ groups include, but are not limited to, tetramethylammonium, tetraethylammonium, tetrapropylammonium, tetra-n-butylammonium, ethyltrimethylammonium, propyltrimethylammonium, cetyltrimethylammonium, tetradecyltrimethyl ammonium, 1,6-hexamethylene bis(trimethylammonium), decamethylene-bis-(trimethylammonium), (2-hydroxyethyl)trimethylammonium, (2-hydroxyethyl)triethylammonium, (2-hydroxyethyl)tripropylammonium, (2-hydroxyethyl)tri-n-butylammonium, (2-hydroxyethyl)methyldiethylammonium, (2-hydroxypropyl)trimethylammonium, (2-hydroxypropyl)triethylammonium, (3-hydroxypropyl) trimethylammonium, (3-hydroxypropyl)triethylammonium, (4-hydroxybutyl)trimethylammonium, (4-hydroxybutyl)triethylammonium, diallyl dimethylammonium, bis(2-hydroxyethyl)dimethylammonium, bis(2-hydroxyethyl)diethylammonium, bis(2-hydroxypropyl)dimethylammonium, bis(2-hydroxypropyl)diethylammonium, tris(2-hydroxyethyl)methylammonium, tris(2-hydroxyethyl)ethylammonium, tris(2-hydroxypropyl)methylammonium, tris(2-hydroxpropyl)ethylammonium, tris(2-hydroxyethyl)octadecylammonium, tetrakis(hydroxymethyl)ammonium, tetrakis(methoxymethyl)ammonium, tetrakis(2-hydroxyethyl)ammonium and tetrakis(2-hydroxypropyl)ammonium.

In another aspect, each n, independently, may be an integer greater 1 and an upper limit of the number average of 30,000 limit. In still other aspects, n (or each n independently) may be an integer greater than 10, or in some instances greater than 50, while in still other instances greater than 100. In other aspects, the upper limit of the number average of n (or each n independently) may be 14,000 or in other instances 12,000, or in some instances 10,000 while in still other instances 7500.

According to another aspect, the polycarboxylic acid may be a polymer of an unsaturated monomer comprising a carboxyl group. Examples of such unsaturated monomers include, but are not limited to, acrylic acid, (meth)acrylic acid, maleic acid, fumaric acid and itaconic acid.

In another aspect, the polycarboxylic acid may be a copolymer of the unsaturated monomer comprising a carboxyl group and a vinyl or olefin-based monomer. Such vinyl or olefin-based monomers include, but are not limited to, (meth)acrylic ester, (meth)acrylonitrile, (meth)acrylamide, vinyl acetate, vinyl chloride, styrene, ethylene, propylene, butene, butadiene, dicyclopentadiene, ethylidenenorbornene and methylenenorbornene.

Particular examples of the polycarboxylic acid may include, but are not limited to, polyacrylic acid, poly(meth)acrylic acid, (meth)acrylamide-(meth)acrylic acid copolymer, (meth)methyl acrylate-(meth)acrylic acid copolymer, (meth)acrylonitrile-(meth)acrylic acid copolymer, ethylene-(meth)acrylic acid copolymer, ethylene-propylene-(meth)acrylic acid copolymer, ethylene-(meth)ethyl acrylate-(meth)acrylic acid copolymer, vinyl acetate-(meth)acrylic acid copolymer, styrene-(meth)acrylic acid copolymer, butadiene-(meth)acrylonitrile-(meth)acrylic acid copolymer, styrene-maleic anhydride copolymer, styrene-maleic anhydride-(meth)acrylic acid copolymer, styrene-fumaric acid copolymer, styrene-fumaric acid-(meth) acrylic acid copolymer, styrene-itaconic acid copolymer or styrene-itaconic acid-(meth)acrylic acid copolymer.

In another aspect, the polycarboxylic acid may have a weight average molecular weight of at least 5000, in other aspects at least 6000, in still other aspects at least 7000 while in still other aspects at least 10,000. In still further aspects, the polycarboxylic acid may have a weight average molecular weight of at most 2,000,000, in other aspects at most 1,000,000, in further aspects at most 1,000,000, and in still further aspects at most 750,000 and in still other aspects at most 500,000. According to one particular aspect, the polycarboxylic acid may have a weight average molecular weight between 3000 and 2,000,000, in further aspects between 5000 and 1,000,000, in other aspects between 6000 and 750,000, in still other aspects between 7000 and 500,000 while in still other aspects between 10,000 and 100,000.

According to another aspect, the aqueous composition may comprise the halogen-free quaternary compound having the formula (I) in an amount of at least 0.01% by weight, or at least 2% by weight, or at least 3% by weight, or at least 4% by weight, or at least 5% by weight, or at least 10% by weight, or at least 15% by weight, or at least 20% by weight or even at least 25% by weight, based on the total weight of the aqueous composition. In another aspect, the aqueous composition may comprise the halogen-free quaternary amine compound having the formula (I) in an amount of at most 99% by weight, or at most 50% by weight, or at most 49% by weight, or at most 48% by weight, or at most 47% by weight, or at most 45% by weight, or at most 40% by weight, or at most 35% by weight, or at most 30% by weight or even at most 25% by weight, based on the total weight of the aqueous composition. In still another aspect, the aqueous composition may comprise the halogen-free quaternary amine compound having the formula (I) in an amount between 0.01% by weight to 99% by weight, or between 0.5% by weight to 50% by weight, or between 1% by weight and 45% by weight, or between 5% by weight and 40% by weight, or between 10% by weight and 37.5% by weight, or between 15% by weight and 35% by weight or even between 20% by weight and 30% by weight, based on the total weight of the aqueous composition. In another aspect, the aqueous composition may comprise the halogen-free quaternary amine compound having the formula (I) in an amount of between 15% by weight to 50% by weight, or between 20% by weight to 50% by weight, or even 25% by weight to 50% by weight and even 35% by weight to 50% by weight, based on the total weight of the aqueous composition.

Because the compositions are prepared as aqueous formulations, they may easily be prepared in any suitable vessel or container. The order of mixing the components is not particularly important and generally the various components can be added sequentially or all at once. Thus, the aqueous compositions may be prepared by: (i) first synthesizing the quaternary amine portion of the compound in water followed by the addition of the polycarboxylic acid; or (ii) synthesizing the quaternary amine portion of the compound in the presence of the polycarboxylic acid; or (iii) synthesizing the quaternary amine portion of the compound in the presence of a portion of the polycarboxylic acid followed by the addition of the remaining portion of the polycarboxylic acid.

Once formulated, the aqueous compositions may be packaged in a variety of containers such as steel, tin, or aluminum cans, plastic or glass bottles and paper or cardboard containers.

It has been surprisingly found that the aqueous compositions containing the halogen-free quaternary amine compound having the formula (I) are useful in a variety of applications. For example, in one aspect, it may be used to inhibit the adverse effects clays have in cement compositions. In particular, the halogen-free quaternary amine compounds of formula (I) have been found to be useful for inhibiting swelling of clays, and therefore prevent or inhibit the adsorption and entrapment of superplasticizes used in cement compositions. Thus, the aqueous composition containing the halogen-free quaternary amine compounds of formula (I) give rise to the possibility of reducing, or even suppressing the loss of fluidity of the cement compositions due to the clays. Generally, aqueous compositions containing the halogen-free quaternary amine compounds according to the present disclosure may give rise to the possibility of suppressing the loss of fluidity of cement compositions over a period of at least 60 minutes, or even at least 90 minutes, or even more at least 120 minutes when added to the cement composition.

Thus, in one aspect, there is provided a method for inerting clays in a cement composition comprising the step of putting one of the constituents of a cement composition in contact with the aqueous composition containing the halogen-free quaternary amine compound of formula (I). Examples of such constituents may include, a hydraulic cement binder, a granulate and/or a gravel, a mineral addition or an admixture used during the preparation of the cement composition (such as a superplasticizer, an anti-air-drag additive and/or a fluidifying agent).

Generally, the clay to be inerted stems from granulates, notably from sand and/or filler. In some instances, the hydraulic cement binder also includes clay. This is notably the case of CEM II/A-L, A-LL, B-L or B-LL cements with lime and cements with pozzolans such as CEM IV or V A or B.

According to another aspect, the present disclosure provides a cement composition comprising a hydraulic cement binder, at least one granulate, water, a superplasticizer and further comprising the aqueous composition comprising the halogen-free quaternary amine compound of formula (I). The cement composition may comprise more than one granulate, for example, sand and a filler. In an aspect, the cement composition comprises a filler, notably a limestone filler. In another aspect, the cement composition further comprises at least one mineral addition and/or an anti-air-drag additive or an anti-foaming agent.

Generally, the cement composition may comprise from 0.005% by weight to 2.5% by weight, notably from 0.01% by weight to 2% by weight, or from 0.05% by weight to 1.5% by weight of actives halogen-free quaternary amine compound of formula (I) component, based on the total weight of the cement composition.

According to another aspect, the present disclosure provides a method for preparing the aforementioned cement composition, comprising the step of mixing a cement composition or a constituent of a cement composition with the aqueous composition comprising the halogen-free quaternary amine compound of formula (I).

The aqueous composition comprising the halogen-free quaternary amine compound of formula (I) may actually be mixed with a cement composition or, in the alternative, with one of its constituents before being put into contact with the other constituents in order to form the cement composition. Mixing of the cement composition or one of its constituents with the aqueous composition comprising the halogen-free quaternary amine compound of formula (I) may be carried out, for example, in a quarry, a concrete producing unit, or during the preparation of mortar.

In yet another aspect, the aqueous composition comprising the halogen-free quaternary amine compound of formula (I) is mixed with a superplasticizer before introducing this admixture into the cement composition. Thus, the present disclosure also relates to a method for preparing the aforementioned cement composition comprising the steps of mixing an aqueous composition comprising the halogen-free quaternary amine compound of formula (I) with a superplasticizer to form an admixture, and then mixing the obtained admixture with at least one granulate, hydraulic cement binder and water.

Accordingly, there is also provided an admixture useful for inerting clay comprising a superplasticizer and an aqueous composition comprising the halogen-free quaternary amine compound of formula (I). In another aspect there is provided an admixture useful for inerting clay comprising a superplasticizer and an aqueous composition comprising the halogen-free quaternary amine compound of formula (I) with or without an antifoaming agent or a defoamer.

It has also been surprisingly found that the halogen-free quaternary amine compound of formula (I) is capable of improving the dispersibility of pigments, such as carbon black, in both aqueous systems and solvent-borne systems. It also was surprisingly found that it maintains the flowability in the pigment concentrates/colorants, even at high pigment concentrations, over a sustained period of time at both room temperature and 50° C.

Thus, there is also provided a pigment dispersion comprising: (a) a pigment; (b) optionally a carrier selected from water, an organic solvent and combinations thereof; and (c) the aqueous composition comprising the halogen-free quaternary amine compound of formula (I); while in some aspects, (d) optionally a resin; and (e) optionally other additives which may include, but are not limited to, a plasticizer, a surface regulator, a UV inhibitor, a light stabilizer, an antioxidant, an antiblocking agent, an anti-foaming or a defoaming agent, a viscosity-regulator, a wax, a surfactant, a leveling agent and a biocide may be present.

In one aspect, the pigment of the pigment dispersion may be selected from organic pigments, inorganic pigments, carbon black pigments (for e.g., furnace blacks, electrically conductive carbon black pigments), extender pigments, corrosion inhibitive pigments; and mixtures thereof.

Examples of organic pigments include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetra-chloroisoindolinone pigments and mixtures thereof.

Inorganic pigments that may be present in the pigment dispersion, include, for example, titanium dioxide, electrically conductive titanium dioxide, and iron oxides (for e.g., red iron oxide, yellow iron oxide, black iron oxide and transparent iron oxides).

Extender pigments include, but are not limited to, silicas, clays, and alkaline earth metal sulfates, such as calcium sulfate and barium sulfate.

The pigment dispersion may also contain corrosion inhibitive pigments, such as aluminum phosphate and calcium modified silica.

More specific examples of pigments are represented by generic names of Color Indexes including Pigment Black 7, Pigment Blue 15, 15:1, 15:3, 15:4, 15:6 and 60, Pigment Green 7 and 36, Pigment Red 9, 48, 49, 52, 53, 57, 97, 122, 144, 146, 149, 166, 168, 177, 178, 179, 185, 206, 207, 209, 220, 221, 238, 242, 254 and 255, Pigment Violet 19, 23, 29, 30, 37, 40 and 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180 and 185, and Pigment Orange 13, 36, 37, 38, 43, 51, 55, 59, 61, 64, 71 and 74. In addition, as for carbon blacks, all of neutral, acidic and basic carbon blacks can be used.

The pigment may be present in the pigment dispersion an amount of at least 0.5% by weight, or at least 5% by weight, and/or at least 10% by weight, based on the total weight of the pigment dispersion. The pigment may also be present in the pigment dispersion in an amount of less than 90% by weight, or less than 50% by weight, or less than 20% by weight, based on the total weight of the pigment dispersion.

Examples of organic solvents, when present, include, but are not limited to, xylene, toluene, alcohols (e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol), ketones or ketoalcohols (e.g., acetone, methyl ethyl ketone and diacetone alcohol), ethers (e.g., dimethyl ether and methyl ethyl ether), cyclic ethers (e.g., tetrahydrofuran and dioxane), esters (e.g., ethyl acetate, ethyl lactate, ethylene carbonate and propylene carbonate), polyhydric alcohols (e.g., ethylene glycol, diethylene glycol, triethylene glycol, propylene glycol, tetraethylene glycol, polyethylene glycol, glycerol, 2-methyl-2,4-pentanediol and 1,2,6-hexantriol), hydroxy functional ethers of alkylene glycols (e.g., butyl 2-hydroxyethyl ether, hexyl 2-hydroxyethyl ether, methyl 2-hydroxypropyl ether and phenyl 2-hydroxypropyl ether), nitrogen containing cyclic compounds (e.g., pyrrolidone, N-methyl-2-pyrrolidone and 1,3-dimethyl-2-imidazolidinone), and sulfur containing compounds (e.g. thioglycol, dimethyl sulfoxide and tetramethylene sulfone).

The amount of the active halogen-free quaternary amine compound of formula (I) that is present in the pigment dispersant may be an amount of at least 0.1% by weight, or at least 0.5% by weight, or even at least 1% by weight, based on the total weight of the pigment dispersion. The amount of the active halogen-free quaternary amine compound of formula (I) pigment present in the pigment dispersion may also be in an amount of less than 25% by weight, or less than 15% by weight, based on the total weight of the pigment dispersion. In some aspects, the amount of the active halogen-free quaternary amine compound of formula (I) that is present in the pigment dispersion may be from 0.1% by weight to 25% by weight, or from 0.5% by weight to 15% by weight, or from 0.75% by weight to 5% by weight, or even from 1% by weight to 2.5% by weight, based on the total weight of the pigment dispersion.

In another aspect, the pigment dispersion contains the pigment and active halogen-free quaternary amine compound of formula (I) in a weight ratio of active halogen-free quaternary amine compound of formula (I) to pigment of from 1:20 to 10:1, or from 1:5 to 5:1 or even from 1:2 to 2:1. In one particular aspect, the pigment dispersion contains the pigment and active halogen-free quaternary amine compound of formula (I) in a weight ratio of active halogen-free quaternary amine compound of formula (I) to pigment of from 1:5 to 1:15.

The pigment dispersion may be prepared by methods that are known to those of ordinary skill in the art. Such known methods typically involve the use of energy intensive mixing or grinding means, such as ball mills or media mills (e.g., sand mills).

In one aspect, the pigment dispersion may be used in the preparation of a coating composition. To form a pigmented coating composition, the pigment dispersion is typically mixed together with known resins, cross-linkers, additives, such as flow control agents, and additional solvents. Coating compositions into which the pigment dispersion of the present disclosure may be incorporated include, for example, liquid spray-, dip- and curtain-applied primer, basecoat (i.e., the basecoat in a color-plus-clear basecoat/ clearcoat system) and topcoat compositions, and electrodepositable coating compositions.

The pigment dispersion may also be used in various printing inks and ink-jet inks. In order to impart fixing properties at color development thereof, a resin may also be incorporated. Examples of usable resins include petroleum resins, casein, shellac, rosin-modified maleic acid resins, rosin-modified phenol resins, nitrocellulose, cellulose acetate butyrate, cyclized rubbers, chlorinated rubbers, oxidized rubbers, hydrochlorinated rubbers, phenol resins, alkyd resins, polyester resins, unsaturated polyester resins, amino resins, epoxy resins, vinyl resins, vinyl chloride resins, vinylidene chloride resins, vinyl chloride-vinyl acetate resins, ethylene-vinyl acetate resins, acrylic resins, methacrylic resins, polyurethane resins, silicone resins, fluorocarbon resins, drying oils, synthetic drying oils, styrene-maleic acid resins, styrene-acrylic resins, polyamide resins, and butyral resins. Other additives which may be included a plasticizer, a surface regulator, a UV inhibitor, a light stabilizer, an antioxidant, an antiblocking agent, a defoaming agent, a viscosity-regulator, a wax, a surfactant, and a leveling agent, a biocide in accordance with a use application of the pigment dispersion.

In still another aspect, there is a provided a method for stabilizing a pigment dispersion comprising the step of putting a pigment in contact with an aqueous composition comprising the halogen-free quaternary amine compound of formula (I).

EXAMPLES

Example 1

Methyl diethanolamine was reacted with ethylene oxide (EO) in the presence of water. The reaction product was adjusted to a 50% by weight aqueous composition. A 6000 M.W. polyacrylic acid (50% by weight aqueous solution) was then used to neutralize the composition. The final aqueous composition contained a quaternary amine with polyacrylic acid as a balance anion in an amount of 50% by weight actives, based on the total weight of the aqueous composition.

Example 2

Methyl diethanolamine and a 6000 M.W. polyacrylic acid (50% aqueous solution) were charged to a reactor. Ethylene oxide (EO) was then charged to the reactor and allowed to react with the mixture. Water was added to adjust the concentration of the final aqueous composition which contained a quaternary amine with a polyacrylic acid as a balance anion in an amount of 50% by weight actives, based on the total weight of the aqueous composition.

Example 3

2-{[2-(2-hydroxyethoxy)ethyl]methylamino}ethan-1-ol and a 6000 M.W. polyacrylic acid (50% aqueous solution) were charged in a reactor. Ethylene oxide (EO) was then charged to the reactor and allowed to react with the mixture. Water was added to adjust the concentration of the final aqueous composition which contained a quaternary amine with a polyacrylic acid as a balance anion in an amount of 50% by weight actives, based on the total weight of the aqueous composition.

Example 4

Evaluation in Cement Compositions

A mortar flow test was performed according to ASTM C1437 (Standard Test Method For Flow Of Hydraulic Cement Mortar). The mortar components included: a) 450 g Type I Portland Cement, b) 1350 g ASTM C778 test sand form local natural silica suppliers, c) sodium montmorillonite having a measured surface area of 58 $m^2/g$, d) a superplasticizer (MIGHTY 21ES available from Kao Corp.) (referred to below as "PCE") and f) inventive Examples 1, 2 or 3 (referred to below as "CMA"). The mixture design was set at a 41% water to cement ratio, 0.14% superplasticizer (PCE) to cement ratio, 0.08% CMA to cement ratio, and 0.5% clay to sand ratio. Control is a comparative sample that did not contain a CMA. The results of the flow test are shown below in Table 1.

TABLE 1

| | PCE/ cement % by wt. | CMA/ cement % by wt. | Flow (mm) 9 min. | Flow (mm) 30 min. | Flow (mm) 60 min. | Flow (mm) 90 min |
|---|---|---|---|---|---|---|
| Control | 0.14 | — | 210 | 100 | X | X |
| Ex. 1 | 0.14 | 0.08 | 218 | 170 | 145 | 105 |
| Ex. 2 | 0.14 | 0.08 | 225 | 200 | 145 | 110 |
| Ex. 3 | 0.14 | 0.08 | 210 | 195 | 175 | 138 |

The results in Table 1 demonstrate the flow of the mortar for the control sample composed of sand/cement/superplasticizer/clay was similar to that for samples containing a CMA at 9 minutes. However, the flow of the mortar in the control sample dropped quickly within 30 minutes of observation. Surprisingly, mortars with the above mentioned CMA's, remained flowable until at least 90 minutes of observation time A slump test was then performed according to ASTM C143 (Standard Test Method For Slump Of Hydraulic-Cement Concrete). The mortar components/amounts were the same as those described for the flow test above. The results are shown below in Table 2.

TABLE 2

| | PCE/ cement % by wt. | CMA/ cement % by wt. | Slump (mm) 9 min. | Slump (mm) 30 min. | Slump (mm) 60 min. | Slump (mm) 90 min |
|---|---|---|---|---|---|---|
| Control | 0.14 | — | 100 | 30 | 7 | X |
| Ex. 1 | 0.14 | 0.08 | 105 | 90 | 75 | 40 |
| Ex. 2 | 0.14 | 0.08 | 110 | 105 | 80 | 50 |
| Ex. 3 | 0.14 | 0.08 | 110 | 110 | 90 | 65 |

The results demonstrate that the slump life for concrete containing a CMA was significantly prolonged as compared to the control sample.

The workability of the mortars was then calculated using the following equation: workability=slump+flow−100. The results are shown in Table 3 below

TABLE 3

| | PCE/ cement % by wt. | CMA/ cement % by wt. | Workability (mm) 9 min. | Workability (mm) 30 min. | Workability (mm) 60 min. | Workability (mm) 90 min |
|---|---|---|---|---|---|---|
| Control | 0.14 | — | 210 | 30 | X | X |
| Ex. 1 | 0.14 | 0.08 | 223 | 160 | 120 | 45 |
| Ex. 2 | 0.14 | 0.08 | 235 | 205 | 125 | 60 |
| Ex. 3 | 0.14 | 0.08 | 220 | 205 | 165 | 103 |

The results in Table 3 indicate that the control sample containing the conventional superplasticizer was negatively affected by the clays. In comparison, the overall workability of the mortars was significantly improved, especially from 30 minutes to 90 minutes, when the inventive CMA's were present.

Example 5

Evaluation in Pigment Dispersions

Examples 1, 2 and 3 (referred to below as a "dispersant") were evaluated as pigment dispersants in paints. A pigment concentrate was prepared in a speedmixer cup with a dispersant, 15% by weight pigment and water. The loading of dispersant was set at a dispersant actives to pigment weight ratio of 1:10. The mixture was then pre-mixed in a speedmixer for 30 sec. at 3000 rpm. 2 mm glass beads were then added to the mixture and the color concentrate was milled for 3 minutes at 3000 rpm. The supernatant colorant was then collected and used to tint a variety of white base paints.

The tinted paint was letdown on a BYK BYKO coating char with a 4 mil BYK-Gardner drawdown bar. After the films dried, a BYK-Gardner spectrometer was used to evaluate color (tint) strength, gloss and rubout stability. BYK 190 dispersant was used as the control. The base paints tested included PPG Olympic One Interior Semi-Gloss Enamel (Base 1-356824), Olympic One Interior Eggshell Enamel (Base 1-356801), Olympic One Interior Eggshell Enamel (Base 3-356806), Olympic One Interior Flat Enamel (Base 1-356794), ACE Royal touch Alkyd Enamel solvent based interior Undercoater (272A101), Benjamin Moore Regal Select Premium interior paint & primer, Semi-gloss Finish (Base 551 1X), Sherwin Williams Extra White Semi-gloss Interior Acrylic Latex, Valspar Ultra paint+primer Interior Semi-Gloss (Base B 391660), Valspar Ultra paint+primer Interior Semi-Gloss (391663), Zinsser, Bulls Eye White tintable Interior and Exterior. Examples of carbon black that were tested included Cabot Regal 660R, Cabot Monarch 1300 and Evonik Degussa Colour Black FW 171.

A 30-day stability test was conducted on pigment colorant at room temperature and 50° C. respectively. On the $30^{th}$ day, the viscosity of the colorant was observed and the supernatant of the colorant was extracted and dispersed into base paints. The tinted paint was letdown on a BYK BYKO coating char with a 4 mil BYK-Gardner drawdown bar. The stability of the colorant was calculated as a percentage of the color change as compared with paint made on the $1^{st}$ day. The results showed that the carbon black dispersion containing the inventive dispersants maintained good flowability on the $30^{th}$ day at both temperature conditions and showed negligible color change as compared to the stability results and color change from the control.

Table 4 below provides data showing the color strength of letdown paints (PPG Olympic One Interior Semi-Gloss Enamel (Base 1-356824), PPG Olympic One Interior Eggshell Enamel (Base 1-356801), PPG Olympic One Interior Flat Enamel (Base 1-356794), Valspar Ultra paint+primer Interior Semi-Gloss (Base B 391660), Benjamin Moore Regal Select Premium interior paint & primer, Semi-gloss Finish (Base 551 1X)) from carbon black (EVONIK CARBON BLACK FW 171) colorants containing the above dispersants using control dispersing additive as a reference point (i.e. 100%). The inventive dispersants containing the quaternary amine neutralized with a polycarboxylic acid demonstrate excellent dispersing capacity for carbon blacks in general. The stability results shows that the colorants maintained their flowability and tinting power after one month of storage at 25° C. and 50° C.

TABLE 4

| Dispersant | PPG Semi Gloss Color Strength | Valspar Semi Gloss Color Strength | Benj. Moore Semi Gloss Color Strength | PPG Flat Color Strength | PPG Eggshell Color Strength |
|---|---|---|---|---|---|
| Ref. | 100% | 100% | 100% | 100% | 100% |
| Ex. 1 | 96.7% | 99.6% | 100.4% | 95.7% | 100.2% |
| Ex. 2 | 90.2% | 95% | 94.2% | 91% | 95.4% |
| Ex. 3 | 93.9% | 97.5% | 94.7% | 94.9% | 98.3% |

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. An aqueous composition comprising water and a halogen-free quaternary amine compound having a general formula (I)

$$[R_1R_2R_3R_4N^+]_n[X^-]_n \quad (I)$$

where $R_1$, $R_2$, $R_3$ and $R_4$ independently represent a linear, or branched, saturated or unsaturated, hydrocarbon chain having less than 25 carbon atoms or wherein $R_1$, $R_2$ and $R_3$ are bound together to form a ring with the nitrogen atom bearing them;
n=1; and
X is a counter anion whose provider compound is a polymer of an unsaturated monomer comprising a carboxyl group having a weight average molecular weight of between 10,000 and 100,000 or a copolymer of an unsaturated monomer comprising a carboxyl group and a vinyl monomer and wherein at least one of $R_1$, $R_2$, $R_3$ and $R_4$ comprises a hydroxyl group.

2. The aqueous composition of claim 1, wherein the $R_1R_2R_3R_4N^+$ group is (2-hydroxyethyl)trimethylammonium, (2-hydroxyethyl)triethylammonium, (2-hydroxyethyl)tripropylammonium, (2-hydroxyethyl)tri-n-butylammonium, (2-hydroxyethyl)methyldiethylammonium, (2-hydroxypropyl)trimethylammonium, (2-hydroxypropyl)triethylammonium, (3-hydroxypropyl)trimethylammonium, (3-hydroxypropyl)triethylammonium, (4-hydroxybutyl)trimethylammonium, (4-hydroxybutyl)triethylammonium, bis(2-hydroxyethyl)dimethylammonium, bis(2-hydroxyethyl)diethylammonium, bis(2-hydroxypropyl)dimethylammonium, bis(2-hydroxypropyl)diethylammonium, tris(2-hydroxyethyl)methylammonium, tris(2-hydroxyethyl)ethylammonium, tris(2-hydroxypropyl)methylammonium, tris(2-hydroxpropyl)ethylammonium, tris(2-hydroxyethyl)octadecylammonium, tetrakis(hydroxymethyl)ammonium, tetrakis(methoxymethyl)ammonium, tetrakis(2-hydroxyethyl)ammonium and tetrakis(2-hydroxypropyl)ammonium.

3. The aqueous composition of claim 1, wherein the unsaturated monomer of the copolymer is selected from the group consisting of acrylic acid, (meth)acrylic acid, maleic acid, fumaric acid and itaconic acid and the vinyl monomer.

4. The aqueous composition of claim 1, wherein the halogen-free quaternary amine compound having the formula (I) is present in an amount of between 0.01% by weight to 99% by weight, based on the total weight of the aqueous composition.

5. The aqueous composition of claim 4, wherein the halogen-free quaternary amine compound having the formula (I) is present in an amount of between 35% by weight to 50% by weight, based on the total weight of the aqueous composition.

6. A method for inerting clays in a cement composition comprising the step of putting a constituent of the cement composition in contact with the aqueous composition containing the halogen-free quaternary amine compound of formula (I) of claim 1.

7. The method of claim 6, wherein the constituent is a hydraulic cement binder, a granulate, a mineral addition or an admixture comprising at least one of a superplasticizer, an anti-air-drag additive or a fluidifying agent.

8. A cement composition comprising a hydraulic cement binder, at least one granulate, water, a superplasticizer and the aqueous composition comprising the halogen-free quaternary amine compound of formula (I) of claim 1.

9. The cement composition according to claim 8, where the cement composition comprise from 0.005% by weight to 2.5% by weight of the active halogen-free quaternary amine compound of formula (I) component, based on the total weight of the cement composition.

10. An admixture useful for inerting clay comprising a superplasticizer and the aqueous composition comprising the halogen-free quaternary amine compound of formula (I) of claim 1.

11. A pigment dispersion comprising: (a) a pigment; (b) optionally a carrier selected from water, an organic solvent and a combination thereof; and (c) the aqueous composition comprising the halogen-free quaternary amine compound of formula (I) of claim 1; d) optionally resins, e) optionally other additives which may include a plasticizer, a surface regulator, a UV inhibitor, a light stabilizer, an antioxidant, an antiblocking agent, an antifoaming or a defoaming agent, a viscosity-regulator, a wax, a surfactant, a leveling agent and a biocide.

12. The pigment dispersion of claim 11, wherein the pigment is an organic pigment, an inorganic pigment, a carbon black pigment or a mixture thereof.

13. A method for stabilizing a pigment dispersion comprising the step of putting a pigment in contact with the aqueous composition comprising a halogen-free quaternary amine compound of formula (I) according to claim 1.

* * * * *